United States Patent [19]
Hiwatashi

[11] Patent Number: 5,384,839
[45] Date of Patent: Jan. 24, 1995

[54] TRUNK APPARATUS FOR LOOP DIALING TRUNK LINE

[75] Inventor: Sanauki Hiwatashi, Hatano, Japan

[73] Assignee: Fujitsu Limited, Kawasaki, Japan

[21] Appl. No.: 212,303

[22] Filed: Mar. 14, 1994

Related U.S. Application Data

[63] Continuation of Ser. No. 584,207, Sep. 18, 1990, abandoned.

[30] Foreign Application Priority Data

Sep. 19, 1989 [JP] Japan ................... 1-240594

[51] Int. Cl.⁶ ............................................. H04M 7/00
[52] U.S. Cl. ..................... 379/219; 379/225; 379/399; 379/229
[58] Field of Search ............... 379/399, 241, 225, 219, 379/229, 231, 240

[56] References Cited

U.S. PATENT DOCUMENTS 3,637,946  1/1972  Hamrick ........................ 379/241

Primary Examiner—James L. Dwyer
Assistant Examiner—Paul A. Fournier

[57] ABSTRACT

A common mode noise removing apparatus connected to connection lines between switching networks, for a loop dial relay line, includes a direct current power source for applying a predetermined direct current voltage to the connection lines, a reverse flow preventing unit connected between the direct current power source and the connection lines, a power supply control supervision unit for supervising the power supply condition of the loop current which flows in a loop, and a short-circuit unit for short-circuiting the reverse flow preventing unit in a mode in which no dial pulse is received by the apparatus from another such apparatus and the power supply control supervision unit detects the loop current.

10 Claims, 14 Drawing Sheets

TRUNK APPARATUS FOR LOOP DIALING TRUNK LINE

This is a continuation of application Ser. No. 07/584,207, filed Sep. 18, 1990 now abandoned.

BACKGROUND OF THE INVENTION

This invention relates to an apparatus for supervising an incoming call to a local station sent from other station, and more particularly, to a trunk apparatus for a loop dialing trunk line.

A conventional interoffice incoming call uses a loop dialing type transmission trunk, i.e., a loop dialing type relay line trunk.

As described in detail later, this is achieved by forming a loop on the transmitting station side with the trunk of the receiving station side which supervises the loop and determines the incoming call by an existence of a loop detection.

FIG. 1 shows a prior art loop dialing type transmission line or trunk line.

A power source 1 of −48V is connected from a power supply supervisory circuit 2 and forward direction diodes 3 and 4 via relay contact points 5a, 5b, 8a and 8b to a tip line and a ring line on the line side. A sending control circuit 6 is also connected to the line side via relay contact points 5b, 8a and 8b.

A voice signal is connected to a transformer 11, usually via a close relay contact point 7a and a capacitor 9 for a DC cut. It is further separated into a receiving signal and a sending signal via a double line/quadruple line conversion circuit 12 and connected to the network side of a private branch exchange (hereafter abbreviated as PBX).

13 is an overvoltage protection circuit. When relay contact points 8a and 8b act in a receiving mode and the polarity between the tip line and the ring line is inverted as a receiver response to the incoming call, from another station relay contact points 8a and 8b are switched in the opposite direction to that shown in the figure. A loopback detection signal 10 detected by the power supply control supervisory circuit 2 is sent to a control part not shown in FIG. 1. Here a receiving control is performed, which controls the sending control circuit 6 via ① of FIG. 1.

FIG. 2 shows an equivalent circuit connected to the loop dialing type transmission line trunk of the above configuration. As FIG. 2 shows, between station A (PBX A) and station B(PBX B), the equivalent circuit is arranged so that the polarities of the power sources 1 in PBX-S A and B are set to face each other.

Where both PBS-S or stations supervise an incoming call, their relay contact points 5a and 5b are connected to the diode 3 and 4. Thus, in an incoming call supervision condition (which is set to detect a call from the other PBX to present PBX); a current does not flow in the part equivalent to the power supply control supervision circuit 2 in FIG. 1. Here, when the voltages of the power sources 1 of the two stations are different, diodes 3 and 4 to prevent flowing current in the reverse direction.

Next, when for instance station (PBX) B sends a call to station (PBX) A, relay contact points 5a and 5b of the station (PBX) B side are switched to the sending control circuit 6 side to form a loop with the direct current power source 1 of the station (PBX) A side, as shown in FIG. 2. Therefore, loop currents $I_0$ and $I_1$ flow in the part equivalent to the power supply control supervisory circuit 2 in FIG. 1. The power supply control supervisory circuit 2 can detect these loop currents, and station (PBX) A can detect a sending action of station (PBX) B.

In the receiving supervisory method using loop dialing, as shown in FIG. 3, a loop dialing type transmission line trunk 14 of FIG. 1 is set between a line 16 and, for instance, a network 15. Yet, due various factors, the line 16 is superposed with a noise N called a common mode noise signal as shown in FIG. 3 between it and the ground G.

In the existing loop dialing type transmission line trunk of FIG. 1, the impedance of the tip line and the ring line against the ground is kept in an equilibrium condition. (Namely, earth balance is maintained.) In a communication condition, loop currents $I_0$ and $I_1$ flow in the normal direction of diodes 3 and 4 of FIG. 1.

As so far described, when the earth balance of the tip line and the ring line is well maintained, said common mode noise N is similarly superposed on the loop current $I_0$ of the tip line side (a positive current) and to the loop current $I_1$ of the ring line side (a negative current). Therefore, as shown in FIG. 4, since $(I_0 - I_1)_{AC}$, namely, the alternate current portion of the differential between $I_0$ and $I_1$ does not arise, the common mode noise N is not converted to the noise between the tip line and the ring line (a normal mode noise). Consequently, noise between the tip line and the ring line (the normal mode noise) is suppressed.

Here, the loop current $I_1$ is the current flowing from the opposite station or PBX via the ring line, and is shown as negative current when the current $I_0$ flowing to the opposite station is defined as positive current, and it does not mean the reverse direction from the arrow of FIG. 1.

However, in this prior art, when the line 16 of FIG. 3 is very long and a commercial power line is set very close to a tip-ring line over a long distance, and when the common mode noise N of a large amplitude that biases in the reverse direction of the diodes 3 and 4 of FIG. 1 because a noise of a commercial alternate current power source is superposed, as shown in FIG. 5, a current clips around a 0 level, and the loop currents $I_0$ and $I_1$ become different from each other. Thus, a difference in the alternate current portion between the loop currents $I_0$ and $I_1$ arises. This differential causes a normal mode noise to be generated. That is, the existing loop dialing type transmission line trunk of FIG. 1 can secure an earth balance sufficient for the common mode noise N that turns the diodes 3 and 4 on, whereas it has the problem that earth balance is lost when the large common mode noise N occurs, causing diodes 3 and 4 to be turned off.

SUMMARY OF THE INVENTION

An object of the present invention is to secure a sufficient earth balance against a common mode noise N with a large amplitude that turns off the diode, thus preventing a reverse current.

A feature of the present invention resides in a trunk apparatus for loop dialing trunk line comprising a direct current power source means for applying a predetermined direct current voltage to a line to which said direct current power source means is connected in receiving and receiving supervision modes, a reverse flow preventing means set between said direct current power source means and said line for preventing a reverse flow of current, a power supply control supervision means for supervising the power supply condition of the loop current that flows in a loop formed by the direct current power source means, the other station side, and a line in a receiving mode, and a short-circuit means for short-circuiting said reverse flow preventing means in a mode in which no dial pulse is received from said other station and said power supply control supervision means detects said loop current. According to the present invention, a trunk apparatus for loop dialing trunk line supervises the receipt of an incoming call at one local station sent from other station. Diodes for preventing a reverse flow are short-circuited, when a dial pulse is not received in a receiving mode, to secure a sufficient earth balance against a common mode noise N of a large amplitude that turns off the diodes. By connecting a sending control circuit to the line on the transmitting station side, a loop is formed with a direct current power source on the receiving station side, and the loop current flows in the forward direction of the diodes to prevent the reverse flow. This loop current is detected by the power supply control supervision circuit on the receiving station side. The receiving station side, in a condition where it detects the loop current and the dial pulse is not received, short circuits the diode by a relay contact point to prevent the reverse flow. In a condition in which the loop current is detected and the dial pulse is received, the relay contact points connected serially with the line become off, so that no normal mode noise is sent to the network side, even if the earth balance is lost.

DETAILED EXPLANATION OF THE PREFERRED EMBODIMENT

Figure 6:
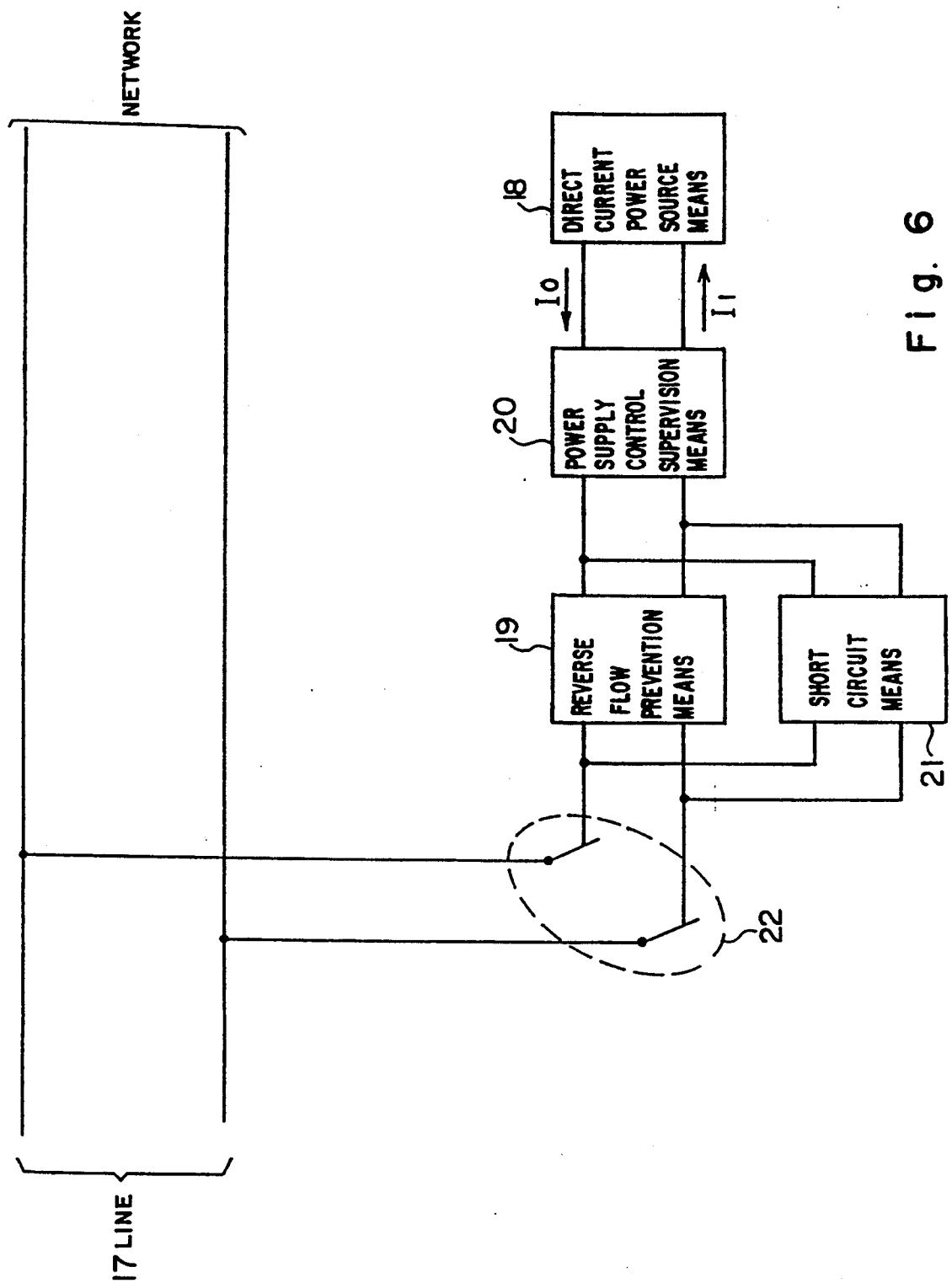
FIG. 6 is a block diagram explaining the principle of the present invention.

FIG. 6 is a block diagram for explaining the principle of this invention. The loopback dialing type transmission line trunk apparatus is set, for instance, to accompany an office exchange or a PBX, and is configured in the following manner.

A direct current power source 18 is connected via lines 17 and applies a predetermined voltage to it in a receiving or receiving supervision mode. The direct current power source means 18 is connected TO the line 17 by a relay 22, shown in FIG. 6, in a receiving mode. In a sending mode, the DC power source 18 is detached from the line 17, and the lines 17 are connected to a sending control circuit or the like to prevent formation of a line loop.

A reverse flow prevention means 19 is set between the direct current power source means 18 and the lines 17 to prevent a current from flowing in the reverse direction. The reverse flow prevention means 19 may be a reverse current prevention diode set in a normal direction to each output of the direct current power source means 18, for instance.

A power supply control supervision means 20 supervises the power supply condition of the loop currents $I_0$ and $I_1$ that flow in a loop formed by a transmitting station in a receiving mode, and detects a dial pulse from a continuance or discontinuance of the loop currents $I_0$ and $I_1$.

A short-circuit means 21 short-circuits the reverse flow prevention means 19 when the power supply control supervision means 20 detects the loop currents $I_0$ and $I_1$ and does not receive a dial pulse, and comprises a relay, for example. The function of the power supply control supervision means 20 is to perform controls such as maintaining the impedance balance of the tip and ring lines against earth and increasing the interline impedance between the tip and ring lines to lower the effect of the power supply impedance against a voice signal between the tip and ring lines. Since the control function is not directly related to this invention, its detailed explanation is omitted.

Since the direct current power source means 18 of the loop dialing type transmission line trunk of each office supplies power to the line 17 via the power supply control supervision means 20 in a receiving supervision mode, the power supply is in a balanced condition, and the common mode noise N generated in the line 17 is not converted to a normal mode noise and is not transmitted to the network side of the exchange machine. Here, the reverse flow prevention means 19 prevents currents from flowing in reverse directions when the voltage of the direct current power source means 18 of each office is different.

In the above receiving supervision mode, if any office becomes a transmitting station, it forms a loop by short-circuiting the line 17 e.g. with a choke coil. Thus, loop currents $I_0 I_1$ flow in the lines 17 connected to a receiving station. If the power supply control supervision means 20 in the loop dialing type transmission line trunk of the receiving station side detects it, and an incoming call is detected, the short-circuit means 21 short-circuits the reverse flow prevention means 19. Consequently, even if the common mode noise N of a large amplitude that biases in the reverse direction to the reverse flow prevention means 19 is superimposed on one of the lines 17, since the function of the reverse flow prevention means 19 is cut, a sufficient earth balance is secured, and the common mode noise N is prevented from being converted to normal noise.

Figure 1:
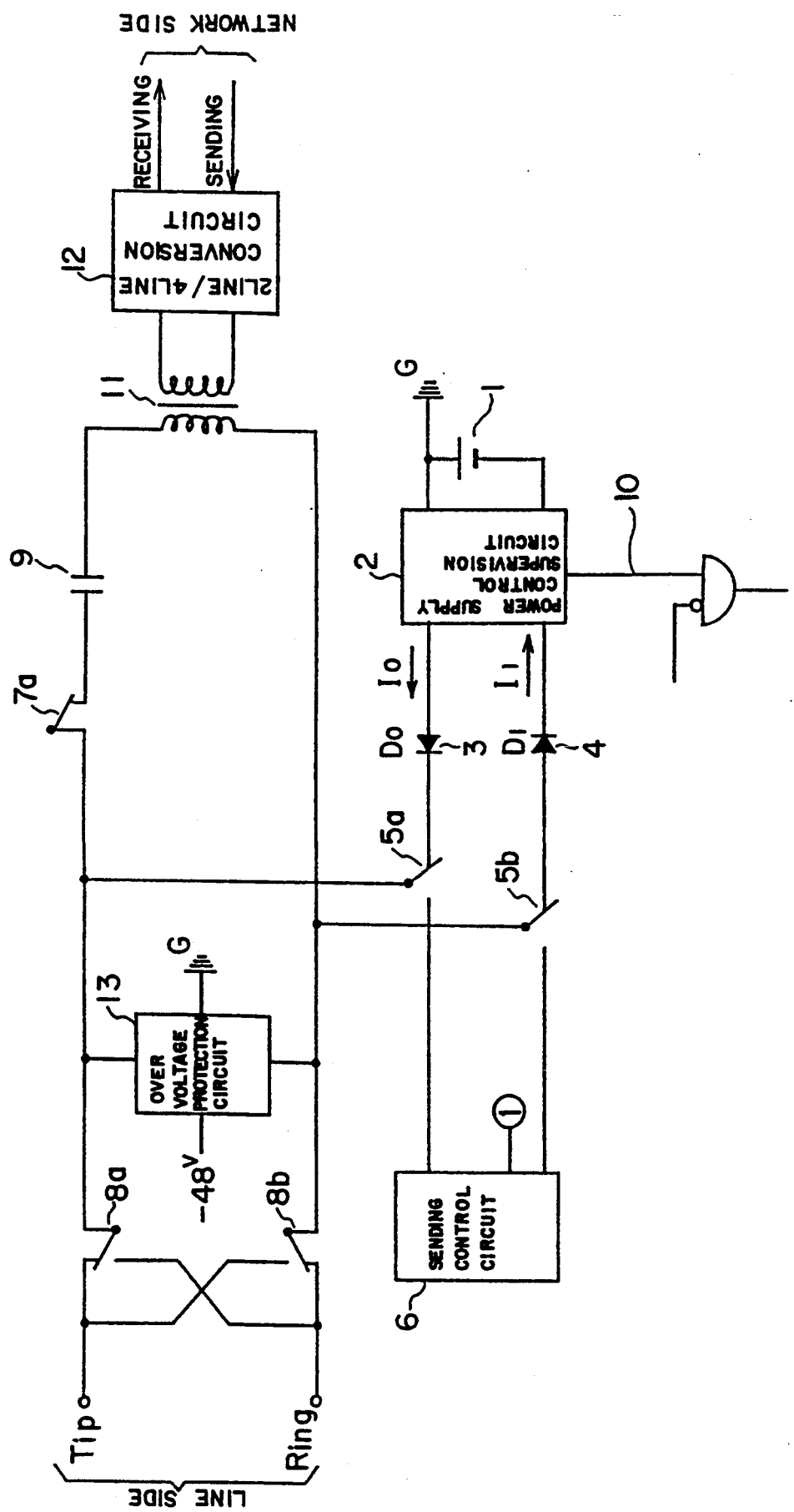
FIG. 1 is a configuration of a trunk line of the prior art.

Furthermore, because the transmitting station side turns the above line loop on and off intermittently, a dial pulse is sent to the receiving station side. This pulse is detected by the receiving station side through the power supply control supervision means 20. In this case, the reverse flow prevention means 19 is functioning, and the balance condition of the impedance among each of the lines 17 against earth is maintained within a range where the above loop currents $I_0$ and $I_1$ do not flow in the reverse direction. Consequently, if a common mode noise N that is large enough to cause loop currents $I_0$ and $I_1$ to flow in the reverse direction is generated while a dial pulse is being received, and is converted to a normal mode noise. Yet, while a dial pulse is being received, the relay contact point 7a in FIG. 1, which is ordinarily in an ON (closed) condition, is turned OFF (opened), and the voice signal coming from the line side is not transmitted to the network of an exchange machine.

Next, an incoming call is successfully received and the communication mode to one station (PBX) from another station (PBX); is phased in. When the power supply control supervision means 20 detects the loop currents $I_0$ and $I_1$ and does not detect a dial pulse, the short-circuit means 21 again short-circuits the reverse flow prevention means 19. As a result, even if such a common mode noise N of a large amplitude that biases the reverse flow prevention means 19 in the reverse direction is superposed to the line 17, since the function of the reverse flow prevention means 19 is cut, a sufficient earth balance can be secured and a common mode noise N can be prevented from being converted to a normal mode noise.

Figure 7:
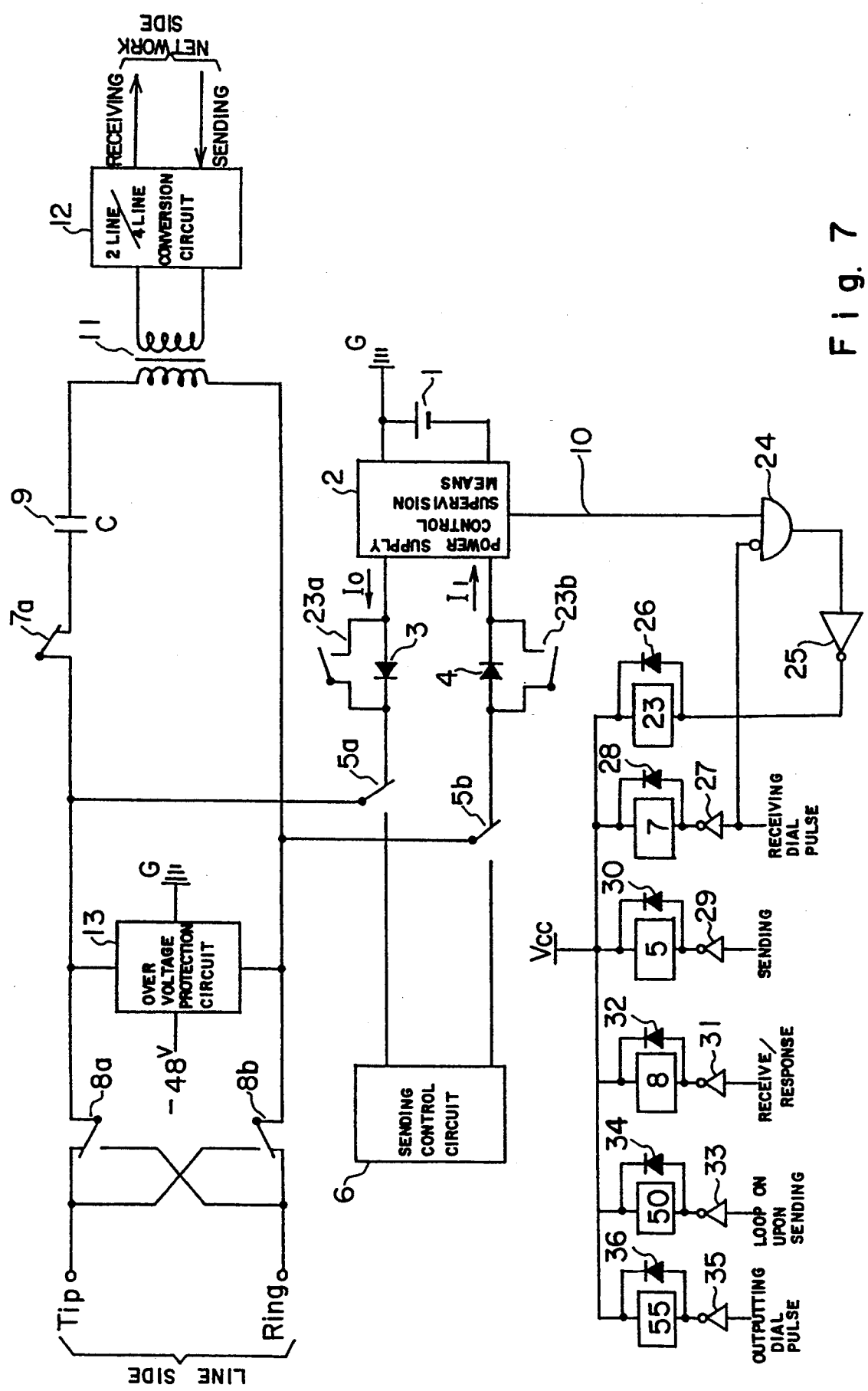
FIG. 7 is a block diagram showing the configuration of an embodiment of the present invention.

FIG. 7 is a block diagram of the preferred embodiment of this invention. Parts with the same numbers as those of FIG. 1 have similar functions, so their explanations are omitted. This embodiment is different from the prior art shown in FIG. 1 in that it has relay contact points 23a and 23b for short-circuiting diodes 3 and 4 for preventing a reverse current from the tip or ring line, and a short circuit control circuit 24 comprising an "AND" circuit for controlling the current of a relay coil 23. The short-circuit control circuit 24 comprises an "AND" circuit. It short-circuits diodes 3 and 4 by turning on the relay contact points 23a and 23b when the loop currents $I_0$ and $I_1$ are detected. This action is based on a current control input of the relay coil 7, which becomes "H" when a dial pulse is received, and the loop detection signal 10 from the power supply control supervision circuit 2 when a dial pulse is not received.

The currents to the relay coils 5, 7, 50 and 55 are controlled by a control part.

The actions of the embodiment of the above configuration are explained below.

Figure 2:
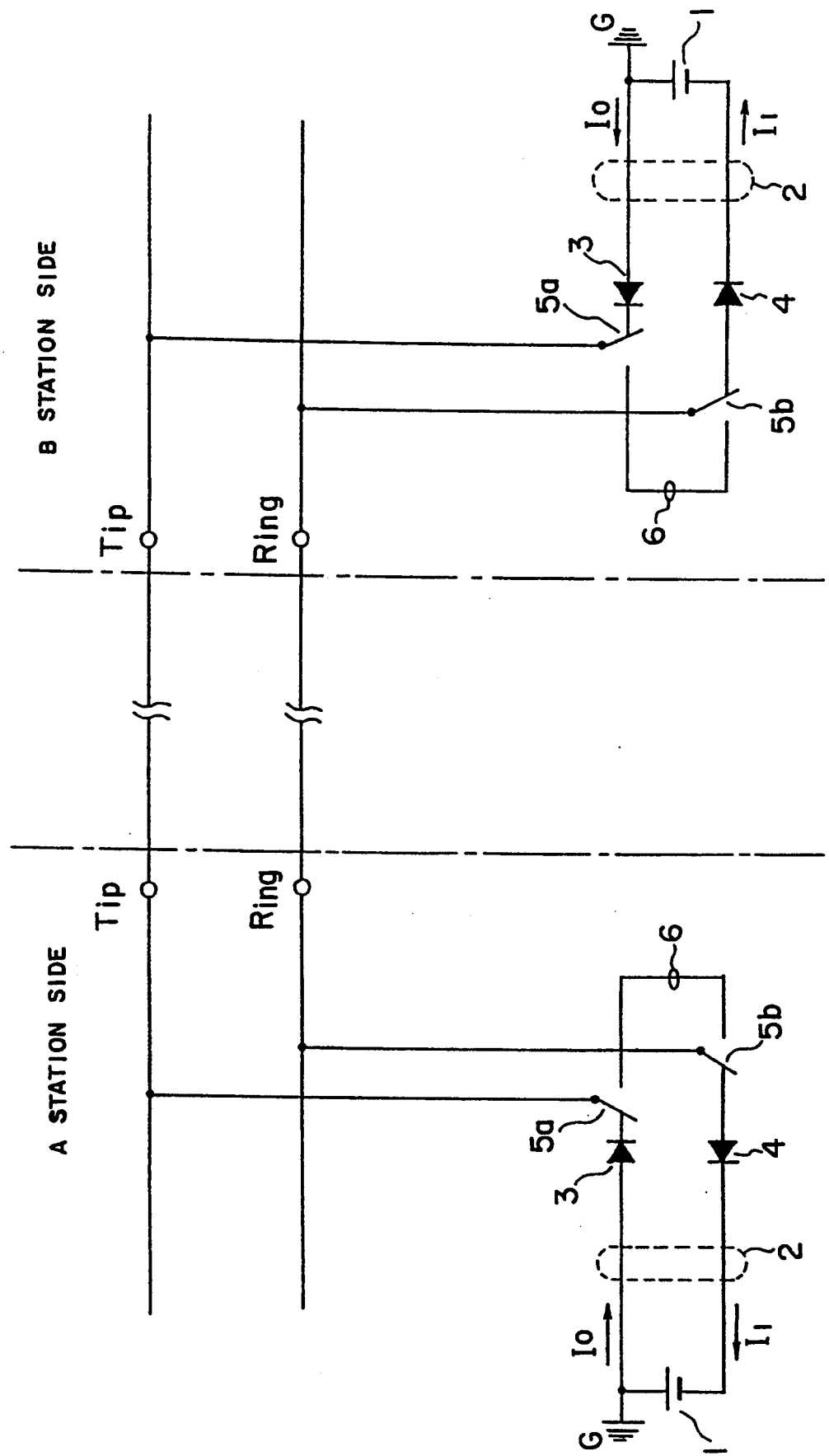
FIG. 2 is an equivalent circuit diagram showing the connection of a loop dialing type transmission line trunk.
Figure 3:
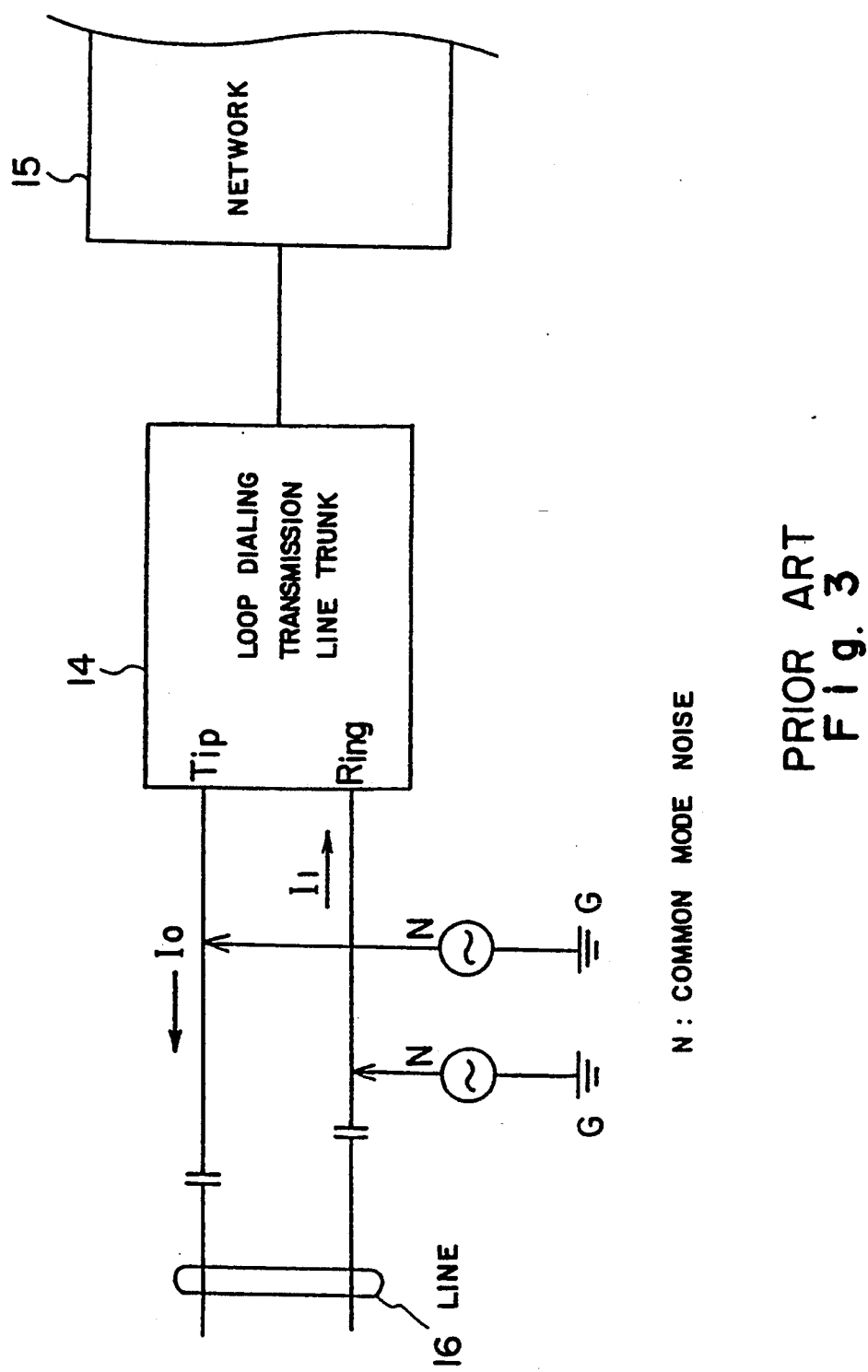
FIG. 3 explains a common mode noise N.
Figure 4:
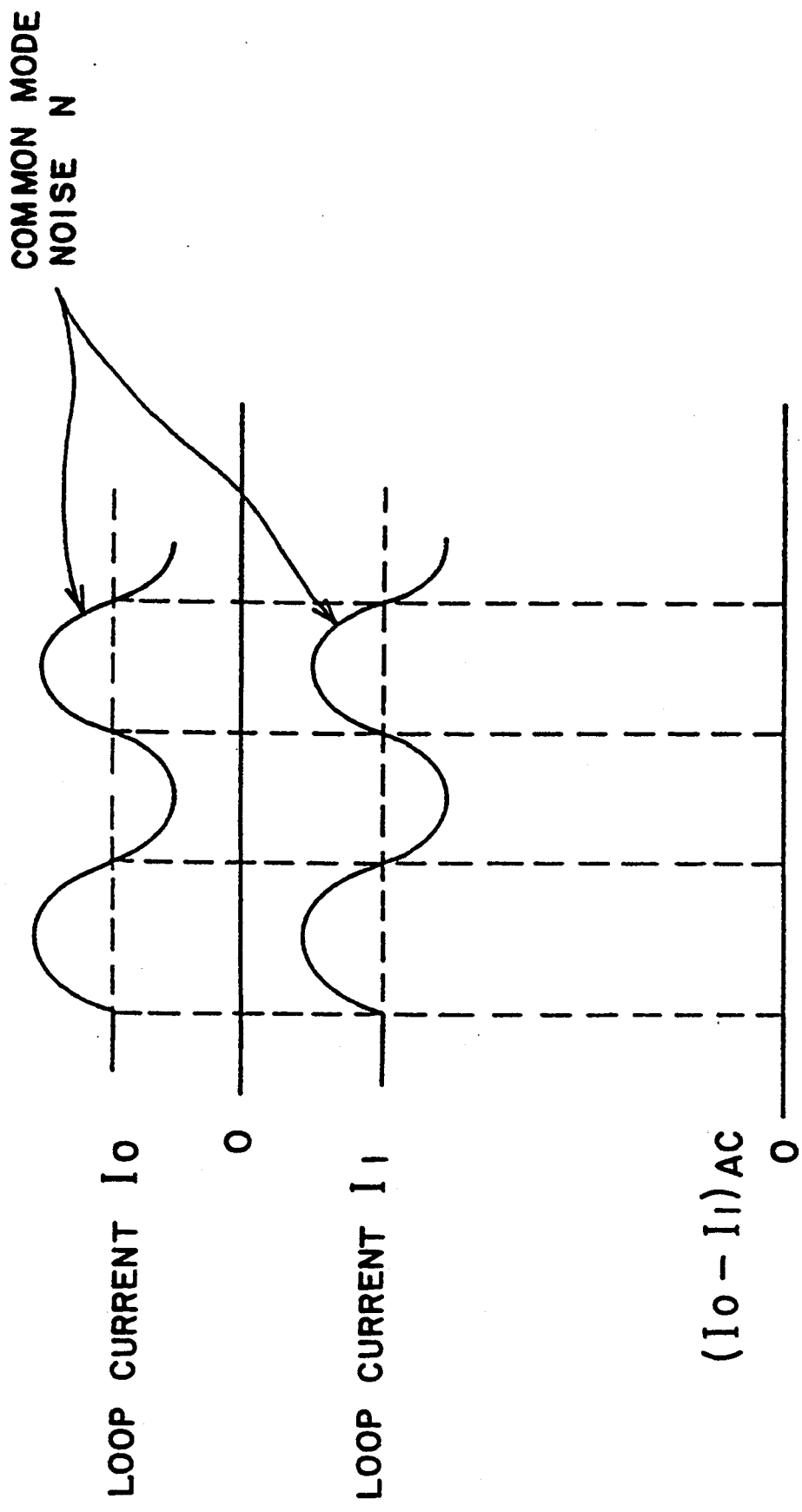
FIG. 4 shows the relation between the loop currents $I_0$ and $I_1$, and the common mode noise N.

First, in the receiving supervision mode, as in the configuration of FIG. 2, the interoffice loop dialing type transmission line trunk connects the relay contact points 5a and 5b with the side of the diodes 3 and 4 so that the polarities of the direct current power source 1 (FIG. 7) faces with each other, and the direct current power source 1 and the line side are connected. Thus, in the receiving supervision mode, a current does not flow in the part equivalent to the power supply control supervision circuit 2 of FIG. 7.

In this mode, since the loop detection signal 10 from the power supply control supervision circuit 2 shows the loop current is off, i.e. "L" (0 V), a short-circuit control circuit 24 comprising an "AND" circuit outputs "L" and the output of a relay driver 25 that can act as an inverter becomes "H" (5V). Therefore, the equality $V_{CC}=5V$ is realized, a current does not flow in the relay coil 23, the relay contact points 23a and 23b remain off, and the diodes 3 and 4 function effectively. Consequently, as in the prior art device shown in FIG. 1, even if the voltage of the direct current power source 1 in the loop dialing type transmission line trunk of each office is different, a reverse current is prevented from flowing from the tip line and the ring line to the power source 1, and a proper receiving supervision is performed.

Also in FIG. 7, a diode 26 connected in parallel with the relay coil 23 is for preventing the relay driver 25 from being destroyed by a back electromotive force generated in the relay coil 23 when the relay contacts 23a and 23b are turned off.

Next, a line loop is formed based on a signal from another office, as explained in the section on the prior art, and loop currents $I_0$ and $I_1$ flow in the power supply control supervision circuit 2. This condition is detected by the power supply control supervision circuit 2 and, since the loop detection signal 10 shows an existence of a loop current, i.e. "H", a control part not shown in the drawing detects receipt of a signal. At this time, the received dial pulse signal is still "L", the output of the short-circuit control circuit 24 comprising an "AND" circuit becomes "H", the output of the relay driver 25 becomes "L", a current flows in the relay coil 23, relay contact points 23a and 23b are turned on, and the diodes 3 and 4 are short-circuited. Thus, even if a common mode noise N current of a large amplitude that biases the diodes 3 and 4 in the reverse direction is superposed on the tip line and the ring line, since the functions of diodes 3 and 4 are cut and the earth balances of both lines become irrelevant to the current direction, the loop currents $I_0$ and $I_1$ are no longer clipped, unlike the case of the prior art shown in FIG. 5. Therefore, the difference between the loop currents $I_0$ and $I_1$ does not arise and a sufficient earth balance is secured, thus preventing a normal mode noise from being generated.

Then, on the transmitting station side with the intermittence of the loop condition the dial pulse is sent. This dial pulse is sequentially detected as the intermittence of loop detection signal 10 from the power supply control supervision circuit 2.

Here, the short-circuit control circuit 24 comprising an "AND" circuit detects the receiving condition of the above dial pulse when the signal of the received dial pulse changes to "H", its output becomes "L", a current does not flow in the relay coil 23 and the relay contacting points 23a and 23b are turned off. Accordingly, in this case, too, the diodes 3 and 4 function effectively and a reverse current is prevented from flowing to the direct current power source 1. A current control logic of the relay coil 7 is inserted in the short circuit control circuit 24 comprising an "AND" circuit is because the loop current becomes intermitent due to the dial pulse control and if the condition is only the loop detection 10, the current intermittence of the relay coil 23 becomes large, and the attrition of the contact points 23a and 23b also becomes large.

After the above actions, the incoming call from another station successfully received and the communication mode (off hook mode) is phased in. If it shifts to a mode where the power supply control supervision circuit 2 detects loop currents $I_0$ and $I_1$, and does not receive a dial pulse, the short-circuit control circuit 24 comprising an "AND" circuit determines this mode based on the current control mode of the relay coil 7 and the loop detection signal 10, and short-circuits the diodes 3 and 4 by turning on the relay contact points 23a and 23b.

Figure 5:
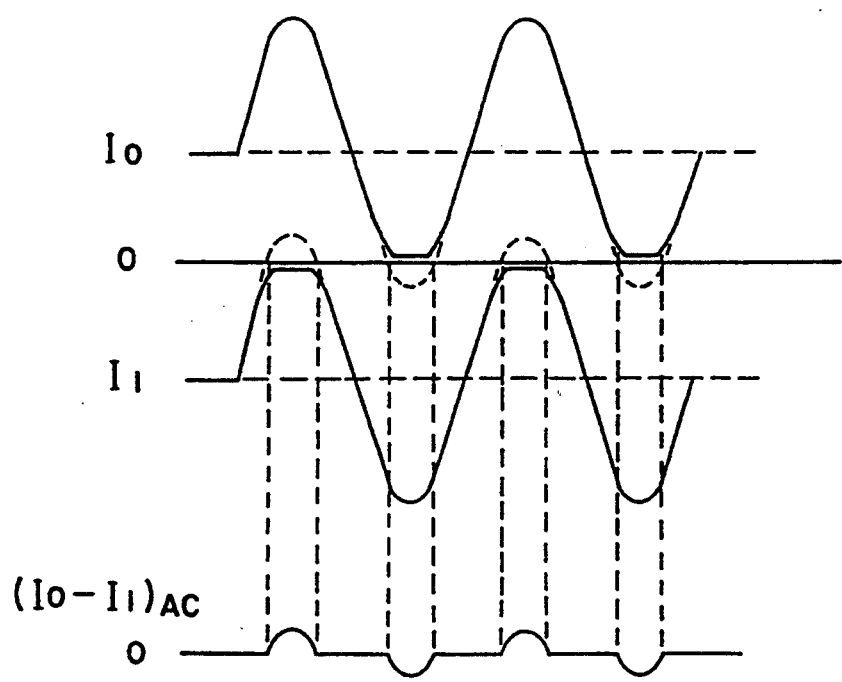
FIG. 5 explains the problems of the prior art.

Thus, even if a common mode noise N current of a large amplitude that biases the diodes 3 and 4 in the reverse direction is superposed on the tip line and the ring line in a communication mode, since the functions of the diodes 3 and 4 are cut and the earth balance of both lines become irrelevant to the current direction, the loop currents $I_0$ and $I_1$ are no longer clipped, unlike the case of the prior art shown in FIG. 5. Therefore, the current difference between the loop currents $I_0$ and $I_1$ does not arise and a sufficient earth balance is secured, thus restricting generation of a normal mode noise.

Also in FIG. 7, as with the relay coils 23 and 7, the currents to the relay coils 5, 8, 50 and 55 flow when the inputs to corresponding relay drivers 29, 31, 33 and 35 become "H".

Figure 8:
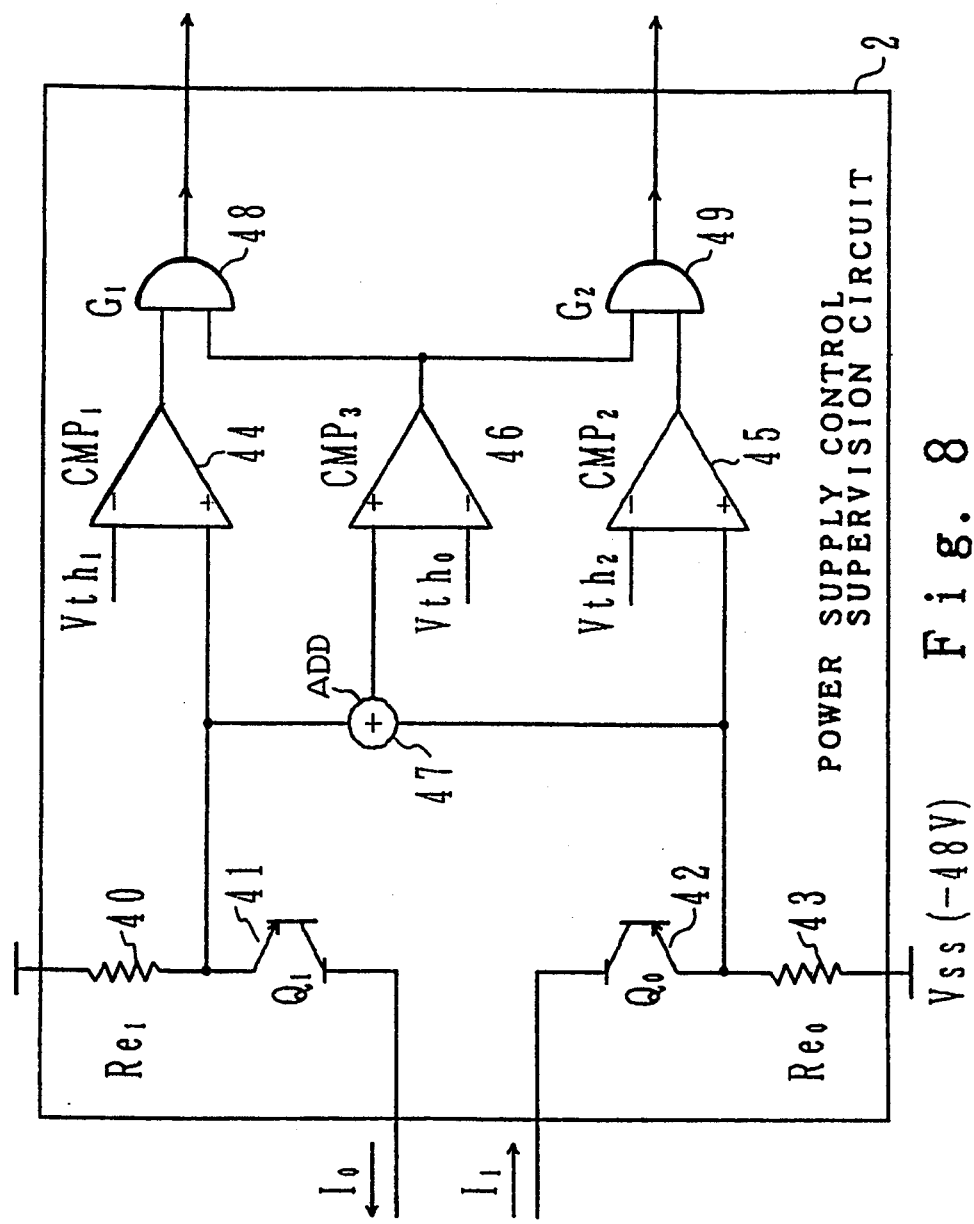
FIG. 8 shows the configuration of the embodiment of the power supply control supervision circuit.

FIG. 8 is a circuit diagram of the embodiment of the power supply control supervision circuit 2. In FIG. 8, the power supply control supervision circuit 2 comprises resistances 40 and 43 and transistors 41 and 42 for supplying the loop current $I_0$ from the direct current power source 1 in FIG. 7 through the power supply control supervision circuit 2 and a line to a receiving station and for feeding the loop current $I_1$ returning from the receiving station back to the direct current power source 1. It also comprises comparators 44, 45 and 46, an adder 47 and two "AND" circuits 48 and 49.

In an ordinary power supply condition to the line, e.g. a normal off hook mode, the loop currents $I_0$ and $I_1$ are almost in balance, and the detection voltages applied to the resistances 40 and 43 are respectively larger than the threshold voltages $Vth_1$ and $Vth_2$ of the comparators 44 and 45. The added result of these detection voltages produced by the adder is larger than the threshold voltage $Vth_0$ of the comparator 46. Therefore, the outputs of the three comparators 44, 45 and 46 are all positive, and as a result, the outputs of the two "AND" circuits 48 and 49 are both "H".

On the other hand, if either the tip line or the ring line is earthed due to an accident, $I_1$ becomes large and $I_0$ becomes very small. Yet, the output from the adder 47 is still larger than the threshold voltage $Vth_0$ of the comparator 46, and the output of the comparator 46 remains positive. Consequently, the outputs from the "AND" circuits 49 and 48 become "H" and "L". When the voltage of the tip line or the ring line becomes −48V due to an accident, the outputs from the "AND" circuits 48 and 49 become "H" and "L". Thus, all modes are identifiable.

In this invention, the output from the "AND" circuit 48 or 49 is used as the loop detection signal 10 of the power supply control supervision circuit 2 in FIG. 7. That is, after the transmitting station side switches the relay contact points 5a and 5b to the side of the sending control circuit 6, the loop currents flow and after the outputs of the "AND" circuits 48 and 49 become "H", the loop is detected.

Figure 9:
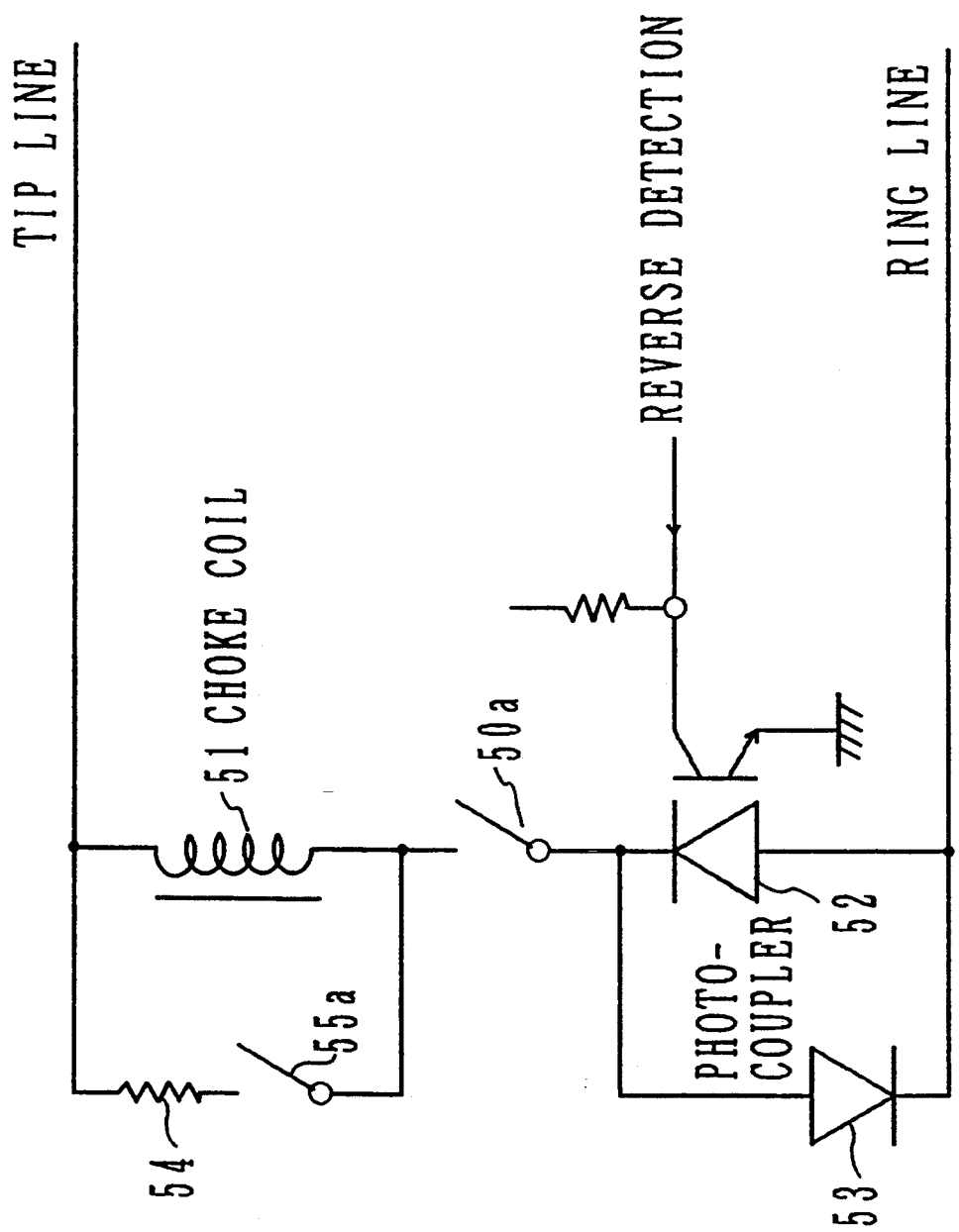
FIG. 9 shows the configuration of an embodiment of the sending control circuit.

FIG. 9 is a circuit of an embodiment of the sending control circuit 6. In FIG. 9, the sending control circuit 6 comprises a serial circuit of the relay contact point 50a, a choke coil 51, a photo coupler 52, a diode 53 connected in parallel to the photo coupler 52, and another serial circuit of a resistance 54 and the relay contact point 5a connected in parallel with the choke coil 51. All of which are inserted between the tip line and the ring line.

The operations of the sending control circuit 6 in FIG. 9 is explained by referring to FIG. 7. As explained earlier, on the transmitting station side, the relay contact points 5a and 5b are switched from the power supply control supervision circuit 2 side to the sending control circuit 6 side and, by letting the current flow in the relay coil 50, the relay contact point 50a is concurrently turned on. Thus, the loop currents flow from the direct current power source 1 on the receiving station side over the line and through the choke coil 51, the relay contact point 50a and the diode 53. The reason why the choke coil 51 is inserted here is because, since a voice signal flows through the line concurrently at communication time, the current flowing into the sending control circuit 6 must be made small by making the impedance of the choke coil 51 large.

When the transmitting station side sends a dial pulse, the relay contact point 55a is turned on, and the loop current flows via the resistance 54, the relay contact points 55a and 50a and the diode 53. The loop current is routed through the resistance 54 instead of the choke coil 51 when the dial pulse is being sent is because the strain reduced when the dial pulse is being sent.

As described earlier, at a subscriber response time, the receiving station side notifies the transmitting station side of the subscriber response by switching the relay contact points 8a and 8b, i.e. a reverse connection. At this reverse detection time, the photo coupler 52 turns on, and the loop current flows from the ring line side via the photo coupler 52, the relay contact point 50a and the choke coil 51 to the tip line side.

Figure 10:
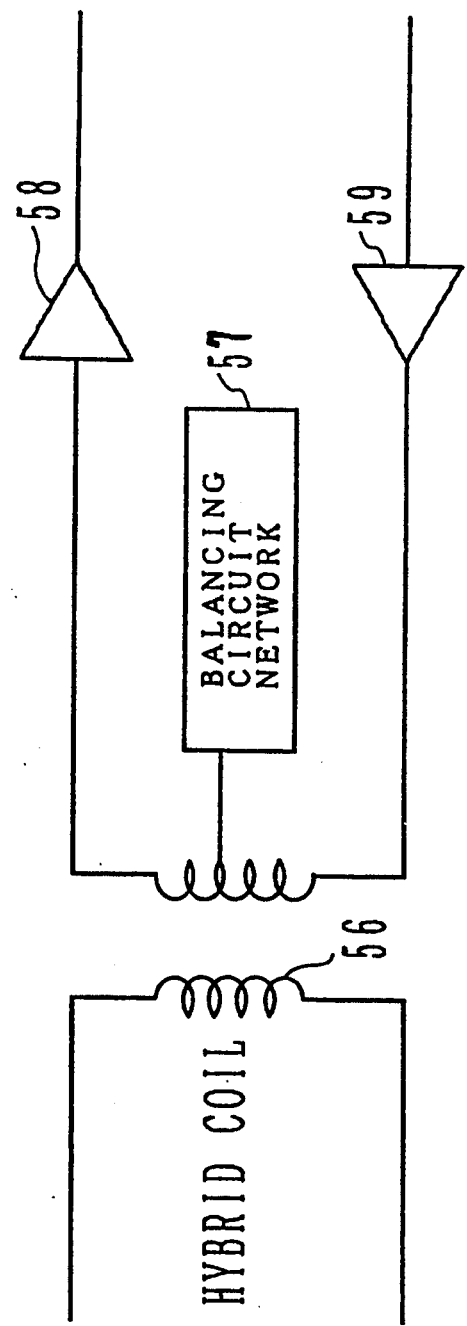
FIG. 10 shows an embodiment of the double line/quadruple line conversion circuit.

FIG. 10 shows an embodiment of the double line/quadruple line conversion circuit 12 shown in FIG. 7. In FIG. 10, the double line/quadruple line conversion circuit 12 comprises a hybrid coil 56, a balancing circuit network 57 and amplifiers 58 and 59.

Figure 11:
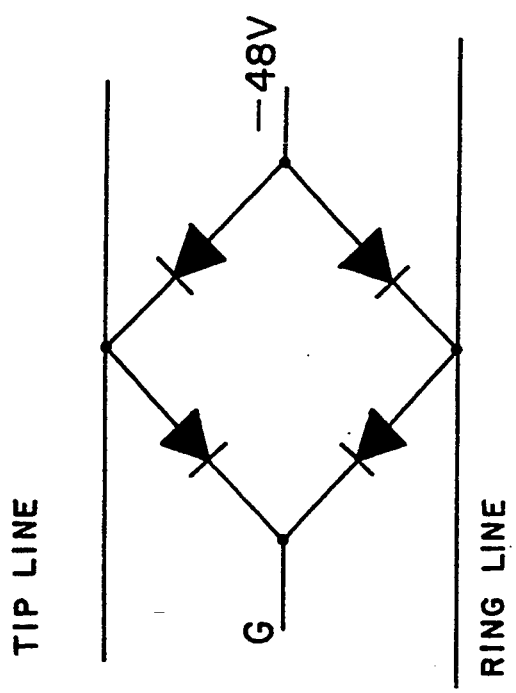
FIG. 11 shows an embodiment of the overvoltage protection circuit.

FIG. 11 shows an embodiment of the over voltage protection circuit 13 shown in FIG. 7. In FIG. 11, the over voltage protection circuit 13 is a bridge diode circuit which clamps the voltages of the tip line and the ring line between the voltage of the direct current power source 1 of −48V and the earth voltage.

Figure 12:
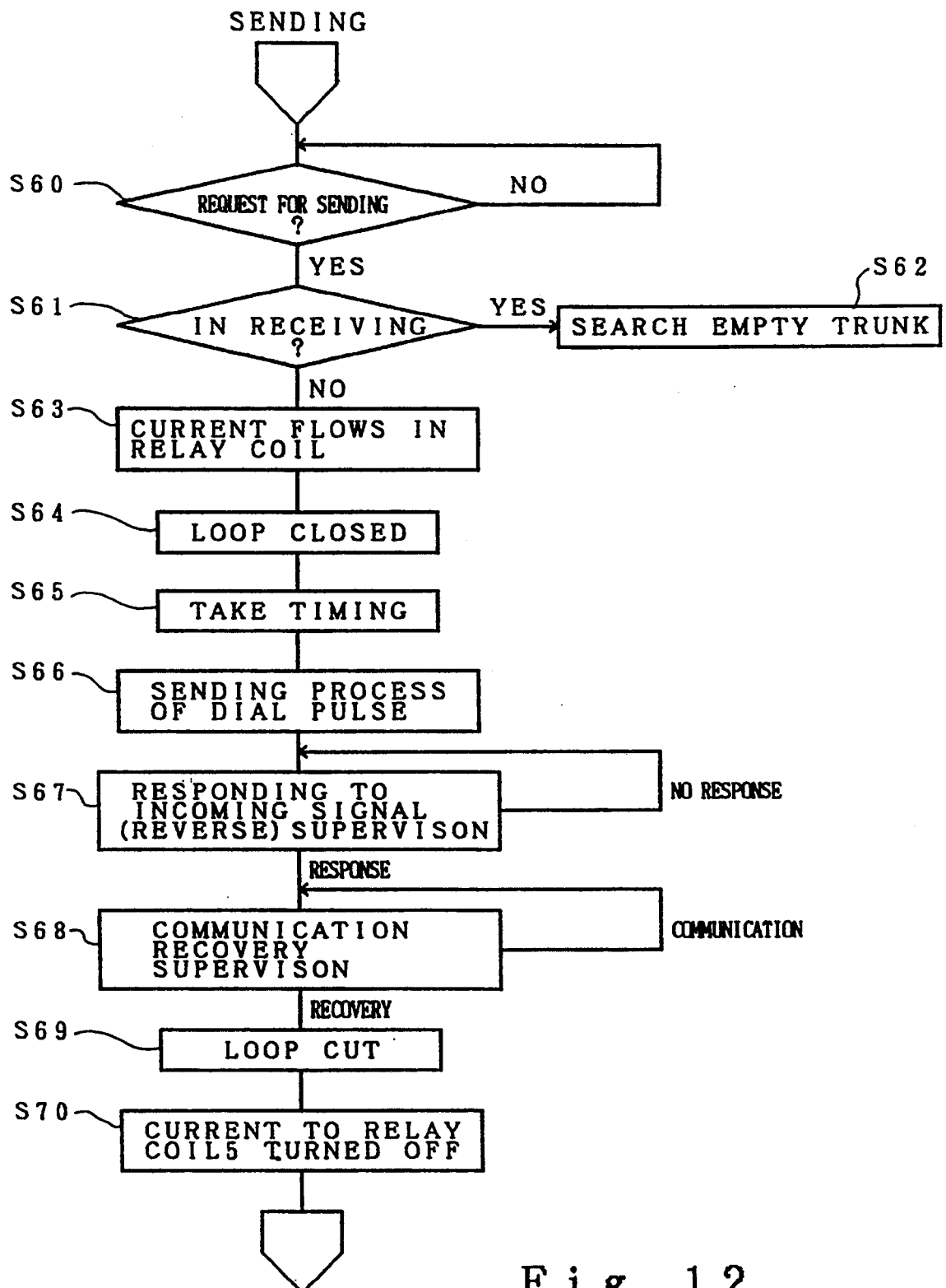
FIG. 12 is a flow chart showing an embodiment of the processings on the transmitting station side.

FIG. 12 is a flow chart of the processing on the transmitting station side. In FIG. 12, a step 60 (S60) judges whether or not there is a sending demand on the transmitting station side, and if there is one, a step 61 (S61) judges whether or not the trunk is receiving an incoming signal. If it is, a step 62 (S62) searches an empty trunk, and if it is not, processing S62 is skipped and a step 63 (S63) switches the relay contact points 5a and 5b to the sending control circuit side by letting a current flow to the relay coil 5, a step 64 (S64) turns on the relay contact point 50a, and a loop is formed with the receiving station side.

Thereafter, a step 65 (S65) takes an appropriate timing as described later, and a step 66 (S66) performs a sending processing of the dial pulse. Then, a step 67 (S67) checks whether or not the addressee response notification from the receiving station side, i.e. the reverse connection processing of the line, has been performed. If there is an addressee response notification, a step 68 (S68) supervises a communication and a recovery.

When S68 detects a recovery and a step 69 (S69) turns off the relay contact point 50a, thus severing the loop. A step 70 (S70) switches the relay contact points 5a and 5b to the power supply control supervision circuit 2 side by stopping the current flowing to the relay coil 5, thus concluding the processing.

Figure 13:
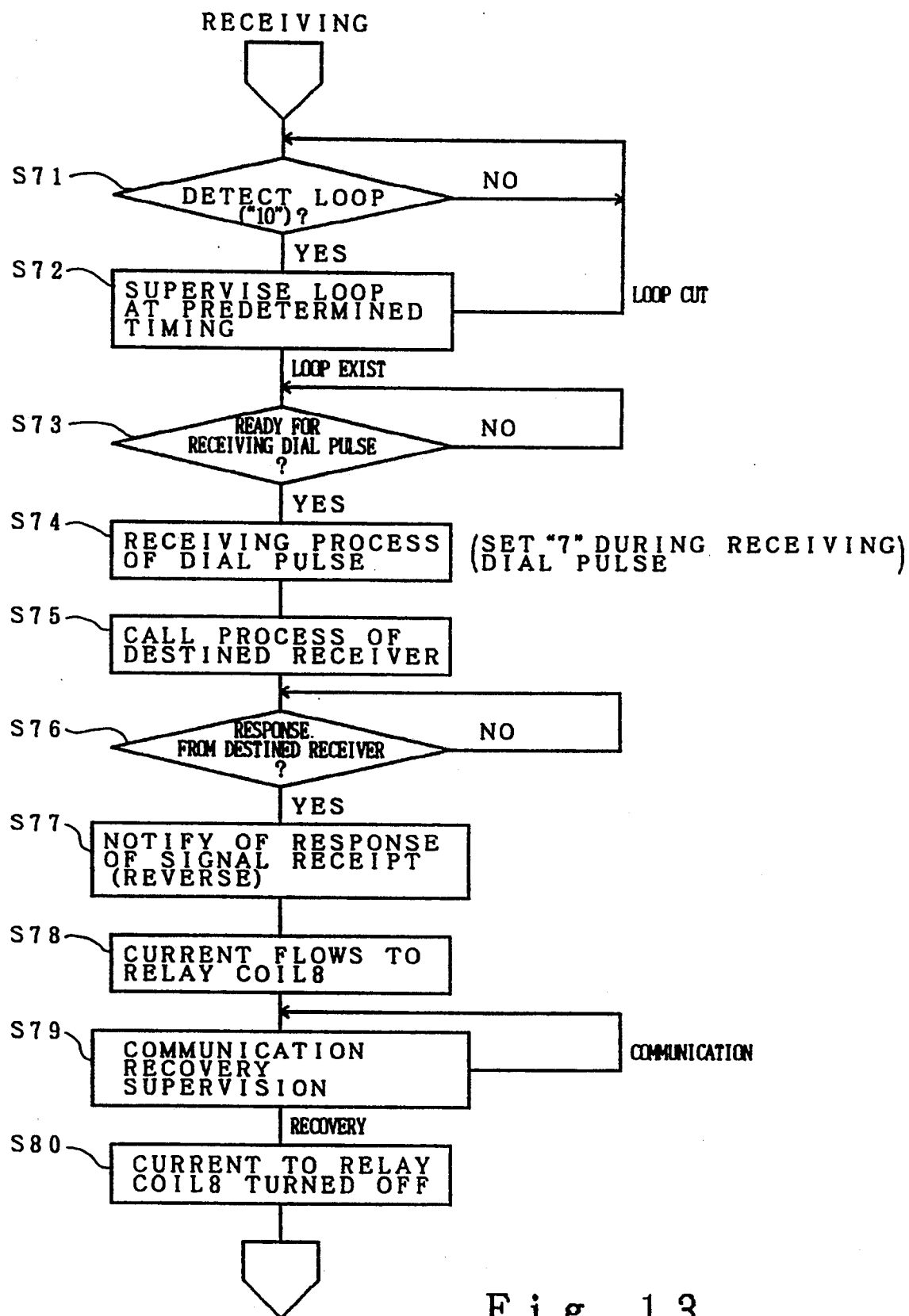
FIG. 13 is a flow chart showing an embodiment of the processings on the receiving station side.

FIG. 13 is a flow chart of an embodiment of the processing on the receiving station side. On the receiving station side, if in a step 71 (S71) the power supply control supervision circuit 2 detects the loop current, a step 72 (S72) supervises the loop for a predetermined period of time. When the loop current is off, the processing from S71 is repeated. If S72 judges that the loop current flows for the predetermined period of time, a step 73 (S73) judges whether or not the dial pulse receipt is ready.

If S73 judges that the dial pulse receipt is ready, a step 74 (S74) processes it, and the relay contact point 7a shown in FIG. 7 is turned off. Then, a step 75 (S75) conducts process to call the receiver, and a step 76 (S76) judges whether or not the receiver has responded.

If S76 judges that the receiver has responded, a step 77 performs the reverse connection of the two lines as a notification of the receiver response by the addressee, i.e. a step 78 (S78) performs a reverse connection of the tip line and the ring line by switching the relay contact points 8a and 8b by letting a current flow to the relay coil 8, a step 79 (S79) supervises a communication and a recovery, and when a recovery is detected, a step 80 (S80) again makes a reverse connection of the two lines by stopping the current from flowing to the relay coil 8, thus concluding the processing.

Figure 14:
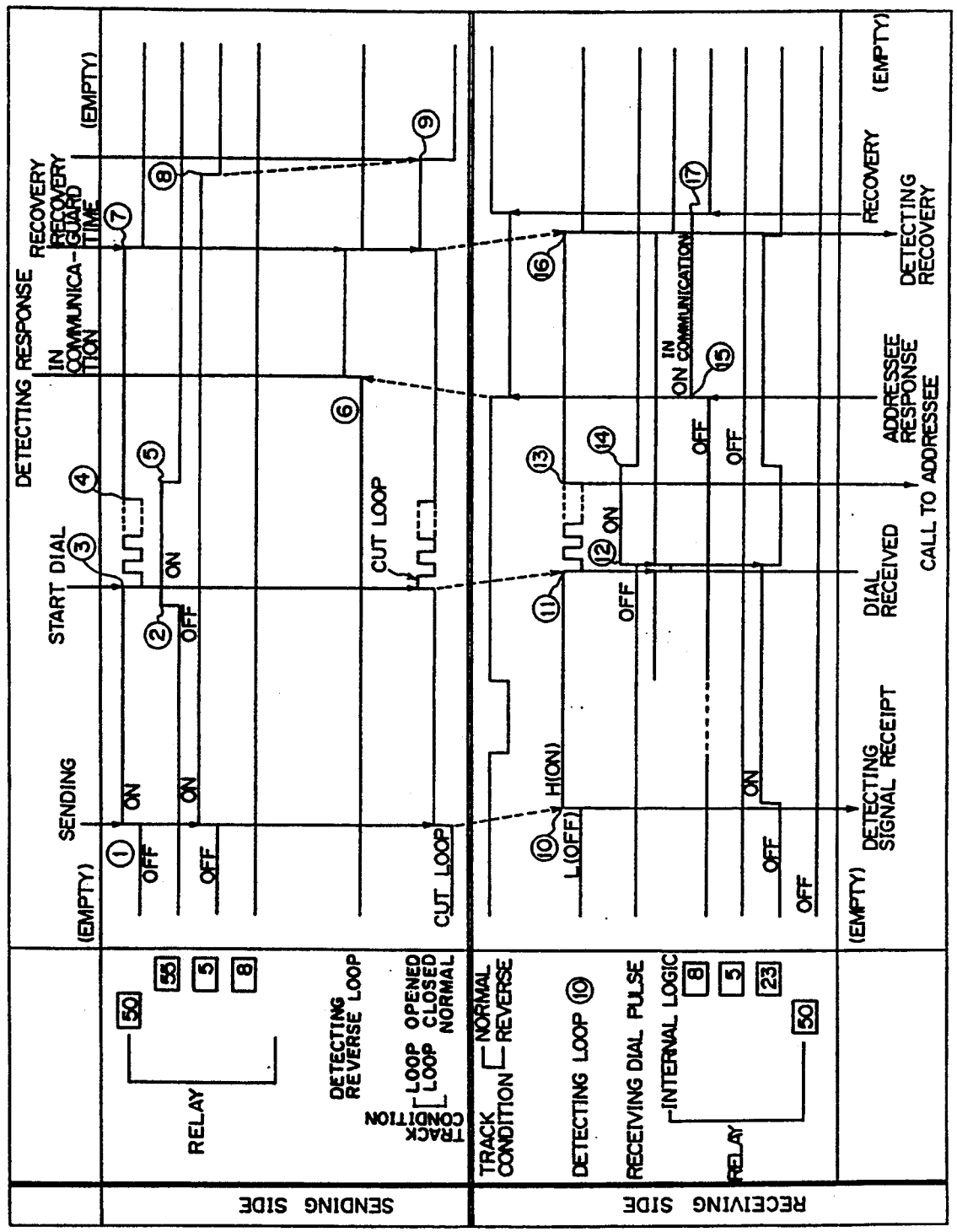
FIG. 14 is a time chart that shows an embodiment of the processings between the transmitting station side and the receiving station side.

FIG. 14 is a flow chart of an embodiment of the processing between the transmitting station side and the receiving station side. In FIG. 14, on the transmitting station side, (1) the currents flow to the relay coils 50 and 5 shown in FIG. 7 the relay contact points 5a and 5b are connected to the sending control circuit 6 side, and the relay contact point 50a shown in FIG. 9 is turned on. The track condition is normal, i.e. the condition in which the loop is severed changes to the condition in which the closed loop is formed. Then after a predetermined period of time, as explained in S65, (2) a current starts to flow in the relay coil 55, and the relay contact point 55a shown in FIG. 9 is turned on. This is a preparation for sending a dial pulse. Thereafter, (3) the dial pulse is sent by an intermittence of the current of the relay coil 50. At this time, the track condition repeats the condition in which the closed loop is formed and the condition in which the loop is opened.

(4) When the dial pulse sending is completed, the current remains to flow in the relay coil 50, and the relay contact point 50a is kept on. The track condition remains that in which the closed loop is formed. Then, (5) the current of the relay coil 55 is stopped, and the relay contact point 55a is turned off. Then, (6) if a reverse processing of the line as the addressee response notification from the receiving station side, i.e. a reverse loop, is detected, the communication is made between the transmitting station and the receiving station, and (7) if a recovery is detected, the current of the relay coil stops and the loop is severed. At this time, the track condition is that in which the loop is opened, and (8) when a recovery guard time has elapsed, the relay contact points 5a and 5b are switched to the power supply control supervision circuit 2 side. Then, (9) the track condition becomes normal and the processings are concluded.

On the receiving station side,

(10) the loop current is detected in response to the sending process of the transmitting station side in (1), i.e. the loop formation, and the current is sent to the relay coil 23, and the relay contact points 23a and 23b short-circuit the diodes 3 and 4. Then,

(11) due to the dial pulse on the transmitting station side, the loop current is in an intermittent condition. As a result,

(12) the signal of a dial pulse being received becomes on. This stops the current to the relay coil 23, and the relay contact points 23a and 23b become off.

(13) The dial pulse from the transmitting station side is concluded, and

(14) when the signal of a dial pulse received becomes off, the current to the relay coil 23 starts to flow again, and by a response from the addressee,

(15) a current starts to flow in the relay coil 8 and the reverse processing of the line is performed. At this time, the track condition is reversed. Then,

(16) the recovery is detected and the loop detection signal becomes off.

(17) Again, the reverse processing of the line is performed, and all the processings are completed.

As explained so far, this invention is effective for interoffice supervision of the receipt of incoming calls. In particular, in the loop current detection mode in which a dial pulse is not being received, even if a common mode noise of a large amplitude is superposed to the line, a sufficient earth balance can be secured.

What is claimed is:

1. A common mode noise removing apparatus connected to connection lines between switching networks, for a loop dial relay, said common mode noise removing apparatus comprising:

direct current power source means for applying a predetermined direct current voltage to said lines to which said direct current power source means is connected in receiving and receiving supervision modes, reverse flow preventing means set between said direct current power source means and said lines, for preventing a reverse flow of current, power supply control supervision means for supervising a power supply condition of a loop current that flows in a loop formed by said direct current power source means and said lines in a receiving mode, and short-circuit means for short-circuiting said reverse flow preventing means in a mode in which no dial pulse is received from said lines and in which said power supply control supervision means detects said loop current.

2. The apparatus according to claim 1, wherein said reverse flow preventing means comprises diodes inserted in a forward direction of the loop current flowing from said direct current power source means to said lines and the loop current flowing back via said lines.

3. The apparatus according to claim 1, further comprising a sending control means, connected to said lines in a sending mode, for forming said loop among said lines, said power source means, and one of said reverse flow preventing means and said short-circuit means.

4. The apparatus according to claim 1, further comprising an "AND" circuit connected to a relay driver an output of which has an inverter effect, and to which a signal indicating a dial pulse receipt is inputted in a negative logic, and a loop current detecting output from said power supply control supervision means is a positive logic, wherein said short circuit means is a relay contact point, and said relay contact point turns on when the dial pulse is not received and said loop current is detected.

5. The apparatus according to claim 1, and further comprising:

a relay contact point that is ordinarily in an "ON" mode between the apparatus and a connecting point between said apparatus and the lines, a capacitor for cutting off a direct current component, a transformer, and a double-line/quadruple-line conversion circuit.

6. The apparatus according to claim 5, wherein said relay contact point that is ordinarily in an "ON" mode turns off only when a dial pulse is received, and transmission of a normal mode noise converted from the common mode noise superposed to the current of said lines to the side of the apparatus is prevented.

7. The apparatus according to claim 5, further comprising a bridge diode circuit as an over-voltage protection circuit that is connected in parallel with said lines between said lines and the connecting point between said lines and said apparatus and clamps an interline voltage between the earth voltage and a voltage of said direct current power source in said apparatus.

8. The apparatus according to claim 5, wherein said double-line/quadruple-line conversion circuit further comprises:

a balancing circuit network, amplifiers and a hybrid coil for eliminating interference between the amplifiers.

9. The apparatus according to claim 1, wherein said power supply control supervision means further comprises:

a first transistor, and a first resistor connected between said lines and an anode of said direct current power source means, a second resistor, and a second transistor connected between said lines and a cathode of said direct current power source means, a first comparator to which a voltage of a connecting point of said first resistor and said first transistor is inputted, a second comparator to which a voltage of a connecting point of said second resistor and said second transistor is inputted, an adder that adds an input to said first comparator and an input to said second comparator, a third comparator to which an added result of said adder is inputted, a first "AND" circuit to which an output of said first comparator and an output of said third comparator are inputted, and a second "AND" circuit to which an output of said second comparator and an output of said third comparator are inputted, wherein the output of one of said first "AND" circuit and said second "AND" circuit is outputted as a loop current detection signal.

10. The apparatus according to claim 3, wherein said sending control means comprises:

a first serial circuit including a choke coil, a first relay contact point, and a photo-coupler connected in parallel with said lines, a second serial circuit comprising a second relay contact point and a resistance connected in parallel with said choke coil, and a diode connected in parallel with said photo-coupler and a direction of which is opposite to that of a diode of said photo-coupler, wherein the first relay contact point turns on to form a loop current at a sending time, the second relay contact point turns on only at the time of outputting of said dial pulse at a sending time and, when a line reverse connection as a notification of a subscriber response from a receiving apparatus is detected, the diode in said photo-coupler is put in "ON" mode.

* * * * *